United States Patent [19]
Anderson et al.

[11] Patent Number: 5,832,268
[45] Date of Patent: Nov. 3, 1998

[54] SYSTEM AND METHOD FOR SUPPORTING COMPLEX OBJECTS IN AN OBJECT ORIENTED COMPUTING ENVIRONMENT

[76] Inventors: James B. Anderson, 522 Grace La., Austin, Tex. 78746; Francis L. Fitzpatrick, 12507 Burlywood Trail, Austin, Tex. 78750; Charles B. Harvey, Jr., 13005 Turkey Run, Austin, Tex. 78727; Adrienne Tin, 56 Elm St., Ridgefield Park, N.J. 07660; James R. Wason, R.R. 1, Box 155, Tuxedo, N.Y. 10987

[21] Appl. No.: 569,521

[22] Filed: Dec. 8, 1995

Related U.S. Application Data

[63] Continuation of Ser. No. 101,913, Aug. 4, 1993, abandoned.

[51] Int. Cl.$^6$ ............................................. G06F 9/40
[52] U.S. Cl. ........................... 395/701; 395/615; 395/683
[58] Field of Search .................... 395/650, 700, 395/600, 701, 703, 702, 615, 683

[56] References Cited

U.S. PATENT DOCUMENTS

| | | | |
|---|---|---|---|
| 4,953,080 | 8/1990 | Dysart et al. ............................. | 364/200 |
| 5,050,074 | 9/1991 | Marca ....................................... | 364/200 |
| 5,057,996 | 10/1991 | Cutler et al. ............................. | 364/200 |
| 5,075,842 | 12/1991 | Lai ............................................ | 395/425 |
| 5,075,845 | 12/1991 | Lai et al. .................................. | 395/425 |
| 5,075,848 | 12/1991 | Lai et al. .................................. | 395/425 |
| 5,095,522 | 3/1992 | Fujita et al. .............................. | 395/200 |
| 5,115,504 | 5/1992 | Belove et al. ............................ | 395/600 |
| 5,161,223 | 11/1992 | Abraham .................................. | 395/600 |
| 5,161,225 | 11/1992 | Abraham et al. ........................ | 395/600 |
| 5,187,786 | 2/1993 | Densomore et al. .................... | 395/600 |
| 5,206,951 | 4/1993 | Khoyi et al. .............................. | 395/650 |
| 5,247,669 | 9/1993 | Abraham et al. ........................ | 395/600 |
| 5,265,206 | 11/1993 | Shackelford et al. ................... | 395/200 |
| 5,283,898 | 2/1994 | Kusumoto et al. ...................... | 395/650 |
| 5,297,283 | 3/1994 | Kelly, Jr. et al. ........................ | 395/650 |
| 5,303,379 | 4/1994 | Khoyi et al. ............................. | 395/700 |
| 5,307,499 | 4/1994 | Yin ........................................... | 395/700 |
| 5,313,629 | 5/1994 | Abraham et al. ........................ | 395/600 |
| 5,361,350 | 11/1994 | Conner et al. ........................... | 395/600 |
| 5,369,778 | 11/1994 | San Soucie et al. .................... | 395/800 |

OTHER PUBLICATIONS

Andleigh et al, P, "Distributed Object—Oriented Data—Systems Design", 1992, pp. 69, 70, 71, 72, 73, 79, 87, 90, and 91.

Booch, G, "Software Engineering with ADA", 1987, pp. 62, 64.

*Representing Domain–Dependent Data in an Object–Oriented System,* K. Barrett et al., IBM Technical Disclosure Bulletin, vol. 34, No. 6, Nov., 1991, pp. 291–300.

*Computer Storage Cleanup Mechanism,* M. J. Anderson et al., IBM Technical Disclosure Bulletin, vol. 24, No. 10, Mar. 1982, pp. 5311–5313.

*Primary Examiner*—Alvin E. Oberley
*Assistant Examiner*—Michael T. Richey

[57] ABSTRACT

A Complex Object class is provided for grouping hierarchically unrelated objects, i.e. objects which are unrelated to each other as parent and child objects, into Complex Objects in an object oriented computing environment. Each Complex Object includes a Complex Object Member frame, containing pointers to associated hierarchically unrelated objects, and Complex Object methods for performing actions on the hierarchically unrelated objects as a group. Accordingly, an object manager can send action messages to the Complex Objects to perform actions on the associated hierarchically unrelated objects using the associated Complex Object methods. As a result, customized programming for defining and utilizing Complex Objects is greatly reduced.

13 Claims, 17 Drawing Sheets

Rulers: PO Header, Ver1
Work Obj: Line 1

```
PO Line Part
  PO1
  Ver2
  Line 1
1. Line HDR
2. Line Text
```

→ Rulers: Ver2, PO HD2 1, Line 1
    Work Obj: Line 1 Text

```
Line Text Entry
Ver 2
PO HDR 1
Line 1

This is the description
```

FIG. 19.

SYSTEM AND METHOD FOR SUPPORTING COMPLEX OBJECTS IN AN OBJECT ORIENTED COMPUTING ENVIRONMENT

This application is a continuation, of application Ser. No. 08/101,913, filed Aug. 4, 1993, now abandoned.

FIELD OF THE INVENTION

This invention relates to data processing systems and methods and more particularly to object oriented computing environments.

BACKGROUND OF THE INVENTION

Object oriented programming systems and processes, also referred to as "object oriented computing environments", have been the subject of much investigation and interest in state of the art data processing environments. As is well known to those having skill in the art, object oriented programming systems are composed of a large number of "objects". An object is a data structure, also referred to as a "frame", and a set of operations or functions, also referred to as "methods", that can access that data structure. The frame has many "slots", each of which contains an "attribute" of the data in the slot. The attribute may be a primitive (such as an integer or string) or an object reference which is a pointer to another object. Objects having identical data structures and common behavior can be grouped together into, and collectively identified as, a "class".

Each defined class of objects will usually be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the named instance, and returning control to the calling high level routine along with the results of the method. The relationships between classes, objects and instances are established during "build time" or generation of the object oriented computing environment, i.e. prior to "run time" or execution of the object oriented computing environment.

In addition to the relationships between classes, objects and instances identified above, inheritance relationships also exist between two or more classes such that a first class may be considered a "parent" of a second class and the second class may be considered a "child" of the first class. In other words, the first class is an ancestor of the second class and the second class is a descendant of the first class, such that the second class (i.e., the descendant) is said to inherit from the first class (i.e. the ancestor). The data structure of the child class includes all of the attributes of the parent class.

As described above, object oriented programming systems are composed of a large number of objects. The amount of data and processing accommodated by an object is typically small enough to be contained within a single row of a database table or a single data entry panel. However, it will be recognized by those having skill in the art that a user view of an object may be considerably more complicated. Thus, simple objects may be tightly bound together as a Complex Object because they all participate in a business process. Alternatively, simple objects may be tightly bound as a Complex Object for purposes of data navigation and presentation or because of cross-object data verifications. In many cases, a simple object cannot be processed correctly without understanding its context. The other objects which provide this contextual information are part of the Complex Object which encompasses the simple object. For example, in an object oriented computing environment which is used to process Engineering Changes (EC), an EC header, Affected Item (AI) and Bill of Materials (BOM) may be separate objects which are not in the same inheritance hierarchy, yet are bound together for purposes of display, verification and context.

It has been heretofore known to present and process Complex Objects by generating customized programming. Unfortunately, the programming which is generated to support Complex Objects can comprise a major portion of an application's customized programming. Moreover, the need to prepare customized programs for Complex Objects may cause one part of the application to deal with Complex Objects in one way and another part of the application to deal with Complex Objects another way. Finally, reuse is decreased because of the highly specific programming which is generated for handling Complex Objects.

SUMMARY OF THE INVENTION

It is therefore an object of the present invention to provide a system and method for supporting Complex Objects in an object oriented computing environment.

It is another object of the invention to provide a system and method for generically supporting Complex Objects in an object oriented computing environment to thereby reduce the amount of customized programming which must be generated.

These and other objects are accomplished, according to the present invention, by providing a Complex Object class for grouping hierarchically unrelated objects, i.e. objects which are unrelated to each other as parent and child object classes, into Complex Objects. Each Complex Object includes a Complex Object frame, containing pointers to associated hierarchically unrelated objects, and a plurality of Complex Object methods for performing actions on the hierarchically unrelated objects as a group. Accordingly, the object manager can send action messages to the Complex Objects to perform actions on the associated hierarchically unrelated objects using the associated Complex Object methods. Customized programming for defining and utilizing Complex Objects is greatly reduced thereby.

In particular, the attributes of the Complex Object Member class are at least one ruler and subobject. The ruler defines the object class which controls the Complex Object Member's performance. Subobjects define one or more object classes, the performance of which are controlled by the Complex Object. Accordingly, the ruler-to-subobject relationship reflects the primary Complex Object structure. It will be understood by those having skill in the art that a subobject may itself be a ruler, allowing for a nesting of Complex Object structures.

Logical key classes are also generated which are placed in a hierarchy of parent and child logical key objects. Each logical key class is associated to a simple object which is a Complex Object Member. The logical key class has the attributes which are needed to uniquely identify an instance of the Complex Object Member. Some of these attributes may be inherited from the parent logical key class. The inherited attributes (from the parent logical key) can be used to identify a unique instance of the ruler of the Complex Object Member within the complex object structure. If the Complex Object Member has subobjects, its logical key is a partial logical key for the subobjects. It can be used to select groups of related subobjects. Each Complex Object Member has a logical key attribute, which points to an instance of its logical key class. Movement from an instance of a ruler to an instance of a subobject is accomplished using the logical key relationships, by using the logical key of the ruler to find the matching subobjects. This allows for the possibility that the objects involved may have versions, in which case an additional version control selection must be provided at run time to uniquely identify a unique instance within the set of versions with the same logical key. Thus, ruler-to-subobject relationships are logical key to logical key (not instance to instance).

The Complex Object method and system of the present invention allows the object oriented computing environment to manipulate Complex Objects as a whole even though the Complex Objects are not defined as part of the inheritance hierarchy of object classes. A separate relationship based on the user view or other frame of reference may be defined among unrelated objects in the inheritance hierarchy, and these objects may then be manipulated as a group. The Complex Object Member instances are identified by providing an inheritance hierarchy of logical keys.

At build time, objects are grouped into Complex Objects in response to a user request. Rulers and subobjects are defined for each of the Complex Object Members. Logical keys for each of the Complex Object Members are also identified and a logical key hierarchy is built. The appropriate logical key is placed in the attribute of each object which is part of a Complex Object.

At run time, when an action message is sent to a Complex Object Member instance, the rulers and subobjects are identified and the identified ruler objects and subobjects are materialized. The logical keys are obtained and used to identify instances of objects which make up the instance of the Complex Object Member. The action message is then performed on all of the identified instances. Accordingly, Complex Objects are supported generically, thereby reducing the need for custom programming. Efficient object oriented computing environments are generated and maintained thereby.

BRIEF DESCRIPTION OF THE DRAWINGS

FIGS. 15–20 schematically illustrate building of a ruler list according to the present invention.

DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Prior to describing a system and method for supporting Complex Objects according to the invention, a general overview of object oriented computing environments will be provided. An overview of a system and method for supporting Complex Objects will then be provided, followed by a detailed design description.

Object Oriented Computing Environment

In an object oriented computing environment, work is accomplished by sending action request messages to an object which contains data. The object will perform a requested action on the data according to its predefined methods. Objects may be grouped into object classes which define the types and meanings of the data, and the action requests (messages) that the object will honor. The individual objects containing data are called instances of the class.

Object classes can be defined to be subclasses of other classes. Subclasses inherit all of the data characteristics and methods of the parent class. They can add additional data and methods and they can override or redefine any data elements or methods of the parent class. An object may be represented schematically, and is represented herein, by a rectangle including an upper rectangle and a lower rectangle within the object rectangle. The upper rectangle contains the data structure represented by a frame having slots, each of which contains an attribute of the data in the slot. The lower rectangle indicates the object's methods which encapsulate the frame and which are used to perform actions on the data encapsulated in the frame of the upper rectangle.

Figure 1:
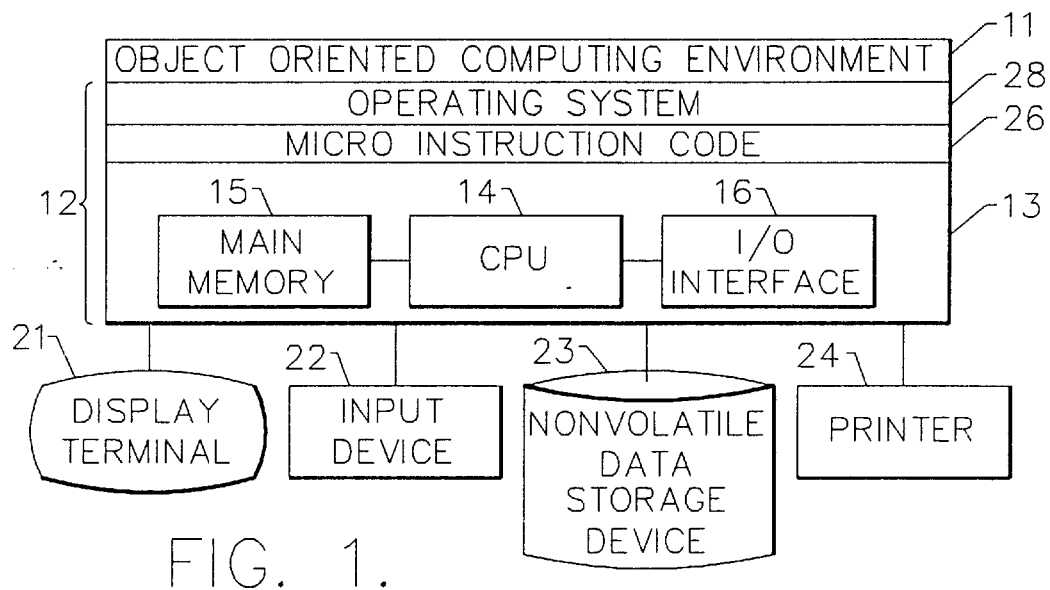
FIG. 1 schematically illustrates a hardware and software environment in which the present invention operates.
Figure 2:
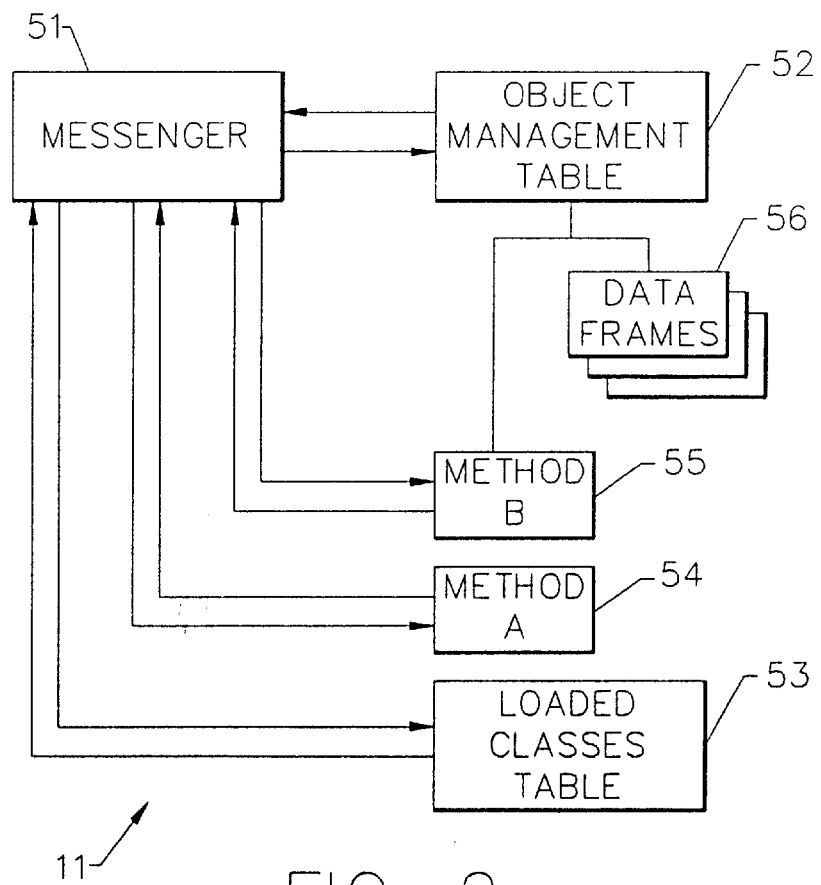
FIG. 2 schematically illustrates the main components of an .object oriented computing system.

Referring now to FIG. 1, a hardware and software environment in which the present invention operates will now be described. As shown in FIG. 1, the present invention is a method and system for supporting Complex Objects within an object oriented computing environment 11 operating on one or more computer platforms 12. Object oriented computing environment 11 includes an object manager, the components of which are illustrated in FIG. 2. It will be understood by those having skill in the art that computer platform 12 typically includes computer hardware units 13 such as a central processing unit (CPU) 14, a main memory 15 and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computer platform 12 also typically includes microinstruction codes 26 and an operating system 28.

As shown in FIG. 1, object oriented computing environment 11 operates on computer platform 12. For example, each computer platform 12 may be a computer having an IBM System 370 architecture. However, it will be understood by those having skill in the art that object oriented computing environment 11 may operate across multiple computer platforms. Operating system 28 may be an IBM multiple virtual storage (MVS). Object oriented computing environment 11 is preferably written in Intermediate C, which is an object oriented dialect of the C computer programming language and is similar to the C++ computer programming language. The design and operation of computer platforms and object oriented computing environments including that of an object manager, are well known to those having skill in the art and are described, for example in U.S. patent application Ser. No. 07/602,442, filed Oct. 23, 1990 to Abraham et al. entitled *A Messenger and Object Manager to Implement an Object Oriented Environment*; and U.S. Pat. Nos. 5,161,225 to Abraham et al. entitled *Persistent Stream for Processing Time Consuming and Reusable Queries in an Object Oriented Database Management System*; 5,151,987 to Abraham et al. entitled *Recovery Objects in an Object Oriented Computing Environment*; and 5,161,223 to Abraham entitled *Resumeable Batch Query for Processing Time Consuming Queries in an Object Oriented Database Management System*, all assigned to the assignee of the present invention, the disclosures of which are hereby incorporated herein by reference, and in numerous textbooks such as *Object Oriented Software Construction* by Bertrand Meyer, published by Prentice Hall in 1988, the disclosure of which is incorporated herein by reference.

Figure 5:
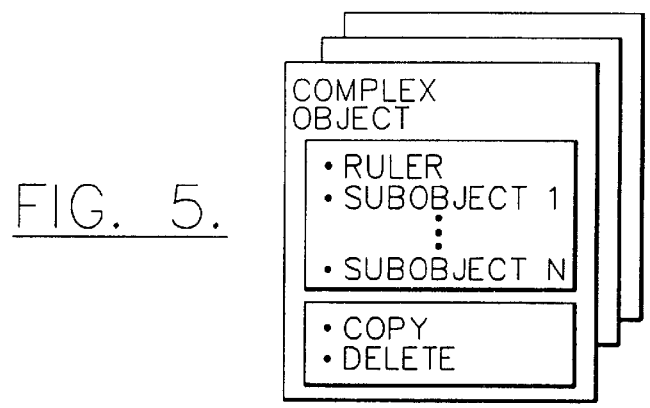
FIG. 5 is a schematic illustration of a Complex Object Member class according to the present invention.

Referring now to FIG. 2, which is a reproduction of FIG. 5 of the aforesaid application Ser. No. 07/425,607, the main components of an object oriented program (11, FIG. 1) will be described. A detailed description of the design and operation of an object oriented program is provided in "Object Oriented Software Construction", by Bertrand Meyer, published by Prentice Hall in 1988, the disclosure of which is incorporated herein by reference.

Referring to FIG. 2, object oriented program 11 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 12 will now be described for the example illustrated in FIG. 2, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

Figure 3:
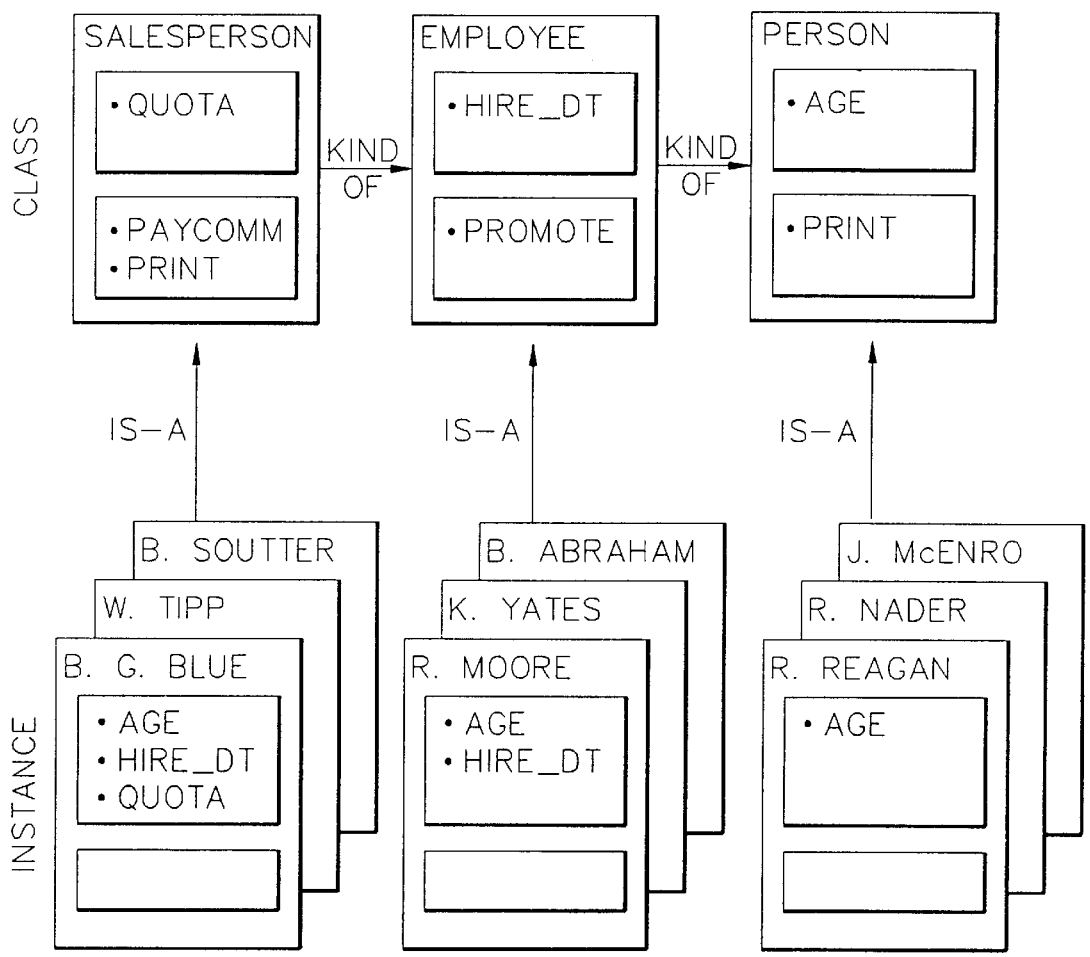
FIG. 3 illustrates an example of an inheritance hierarchy in an object oriented computing system.

FIG. 3 illustrates an example of an inheritance hierarchy in an object oriented computing platform. As shown, three object classes are illustrated for "salesperson", "employee", and "person", where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates, and R. Moore are employees. J. McEnroe, R. Nader, and R. Reagan are persons. In other words, an instance is related to its class by an "is a" relation.

Each subclass "inherits" the frames and methods of its superclass. Thus, for example, a salesperson frame inherits age and hire date objects from the employee's superclass as well as promote methods from the employee superclass. Salesperson also includes a unique quota attribute and a pay commission method. Each instance can access all methods and frames of its superclass, so that, for example, B. G. Blue can be promoted.

Complex Object Support Method and System:
Overall Design and Operation

Figure 4:
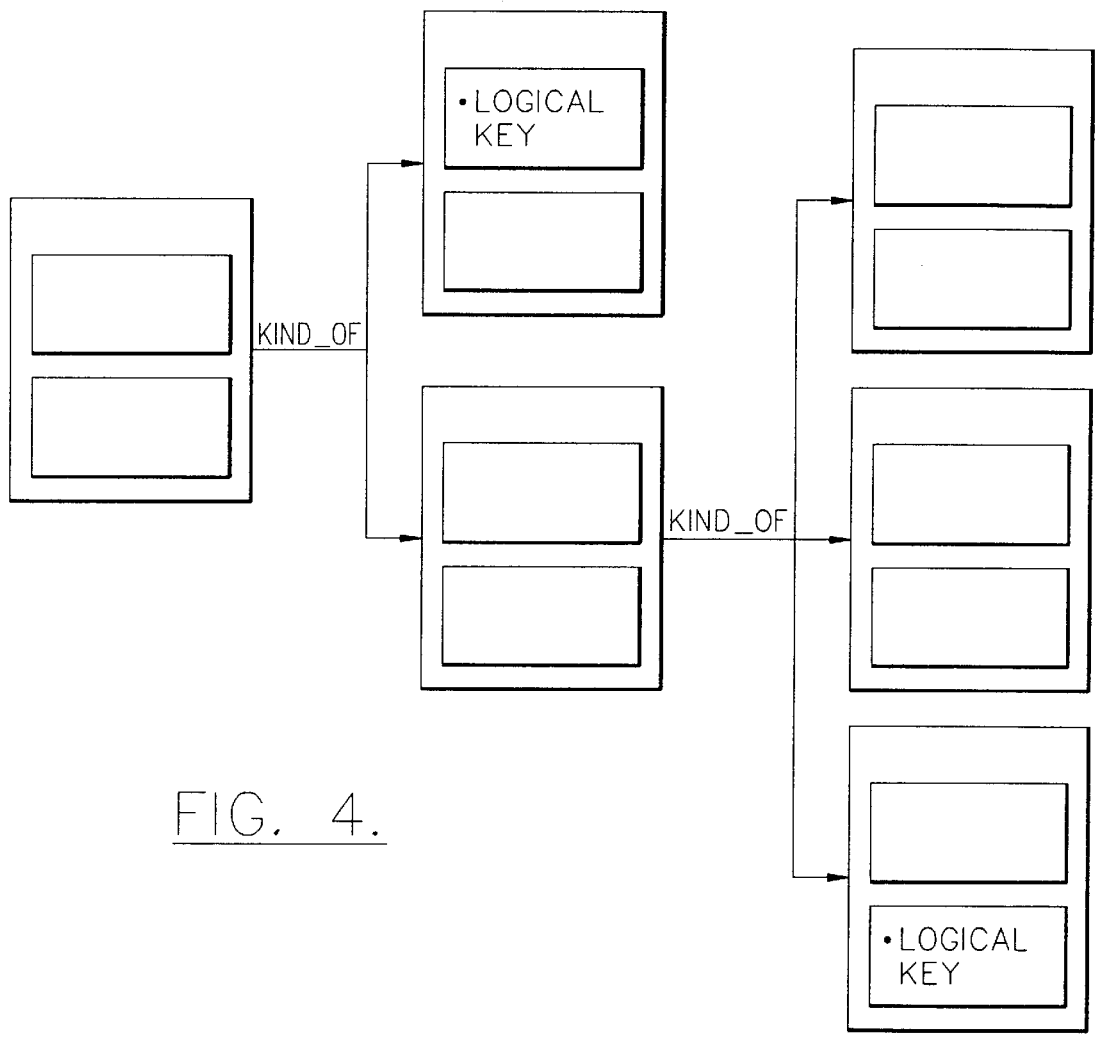
FIG. 4 is a schematic illustration of a plurality of objects, at least some of which include a logical key attribute according to the present invention.

Referring now to FIG. 4, a schematic illustration of a plurality of objects in a computing platform, at least some of which include a logical key attribute, is illustrated. As shown in FIG. 4, a plurality of objects execute in object oriented computing environment 11 on computing platform 12. Each object includes an object frame containing data attributes and at least one object method for performing actions on the associated object. As with FIG. 3, each object is represented by a rectangle, with the attributes contained in an upper rectangle within the object rectangle and the methods contained in the lower rectangle within the object rectangle. As also shown, the objects are arranged in an inheritance hierarchy of object classes to define parent and child classes such that child classes inherit the data attributes and methods of parent classes. It will be understood by those having skill in the art that the inheritance hierarchy of object classes typically includes many thousands of objects in an object oriented computing environment.

Still referring to FIG. 4, it will be understood that at least some of the hierarchically unrelated objects are to be grouped into a Complex Object. The Complex Object is a grouping of hierarchically unrelated objects, i.e. objects which are unrelated to each other as parent and child object classes. Rather, they are grouped together due to common display requirements or other common external requirements. As shown in FIG. 4, each object in the hierarchy of the objects which is part of a Complex Object includes as an attribute a "logical key". The logical key is the attribute which is used to uniquely identify an instance of an object. In addition, the logical key of a ruler is the partial logical key of the subobject. As will be described below, a successive expansion of logical keys is used in order to find those objects which belong to a particular ruler.

Referring now to FIG. 5, a schematic illustration of a Complex Object class is illustrated. As shown, a Complex Object class includes as its attributes, a least one of a ruler object and a subobject. A ruler object is an object which must be present before the subobject can be acted on. Accordingly, each object in a Complex Object must have a ruler except for the highest level object in the Complex Object. A subobject is an object which is not related to the ruler by the characteristic of inheritance but rather is related because of the Complex Object relationship. A ruler object may have multiple subobjects which it rules. As also shown in FIG. 5, the Complex Object includes a plurality of methods such as copy and delete, which act on the Complex Object class as a whole. These methods will be described in detail below.

Figure 6:
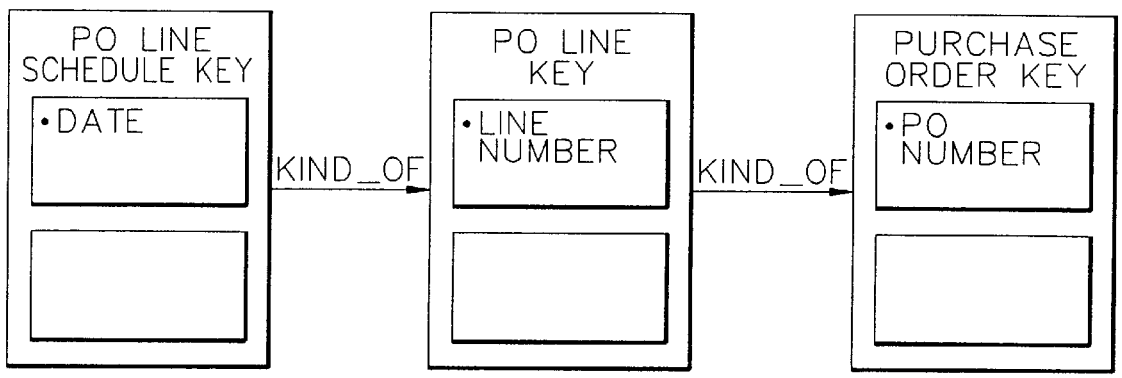
FIG. 6 schematically illustrates an inheritance hierarchy of a logical key class according to the present invention.

Referring now to FIG. 6, another aspect of the present invention generates a logical key class. A logical key uniquely identifies an instance of an object. The logical keys of each object in the Complex Object's structure are related by an inheritance hierarchy shown in FIG. 6. Thus, even though the simple objects in the Complex Object are not related by inheritance, their logical keys are related by inheritance. The ruler/subobject relationship is therefore logical key to logical key, and the inheritance structure of the logical keys follows the Complex Object structure.

Complex Object support is provided by inheriting from the Complex Object Member Class. This class enforces standardization of Complex Object handling, and provides support for most Complex Object actions. It is compatible with other generic application support such as version control and interfaces with externals and the data base.

Simple objects within a Complex Object are bound together by logical key and data dependency relationships. The "logical key" identifies the simple object up to version selection. Complex Objects may also be version controlled. The data dependency relationships are described as ruler-to-subobject relationships. Within a Complex Object, the logical key of a subobject has all the attributes of the logical key of its ruler. For a particular instance of the subobject, the data values of the logical key match those of its ruler. The object may add attributes to the logical key of its ruler. If it does, the ruler-to-subobject relationship is one-to-many. If the subobject logical key is identical to the ruler logical key, the ruler-to-subobject relationship is one-to-one.

Within the Complex Object, each subobject can only have one type of class as its ruler. However, a ruler may have several types of classes as subobjects. This enforces the hierarchy of the Complex Object structure. The same object may be both a subobject and ruler. The identification of the classes which are rulers and subobjects is provided by class attributes of the Complex Object class. These class attributes allow override, so that Complex Object structures may be altered during customization. Complex Object support is compatible with generic version control support, as described in copending application Ser. No. 08/101,618 filed concurrently herewith entitled *System and Method for Controlling Versions of Objects in an Object Oriented Computing Environment*, the disclosure of which is hereby incorporated herein by reference. Since the logical key only identifies an instance of an object up to version, the ruler-to-subobject may be "fuzzy" (i.e., defined only up to version selection).

A list of the objects needed to provide contextual information is carried as an instance attribute of the Complex Object Member Class. During interactive processing this list can be built dynamically, since the data navigation from panel to panel typically follows the Complex Object structure. However, background processing may require this list to be built up from context keys provided as a part of a batch transaction. The present invention provides support to add the chain of rulers within the Complex Object to the list, and it provides a deferred method to add additional context information.

The context may determine if the data being manipulated can be viewed or updated. Deferred methods are provided to check the context information. The calls to these methods are already provided at appropriate places within display and update methods, so that context checking is integrated into standard processing.

When certain actions are performed on an object which is a ruler, they must also be performed on each of its associated subobjects. If any of the subobjects is itself a ruler, the same action must be cascaded down through the primary Complex Object structure. The present invention provides specific support for several Complex Object actions (copy, delete and promote). It also provides generic support to enable additional cascaded Complex Object actions using the same mechanisms.

Data navigation through Complex Objects tends to follow the primary Complex Object structure. The presentation of Complex Objects may be related to the generic presentation support as described in copending application Ser. No. 08/101,904 entitled *System and Method for Providing a Uniform External Interface for an Object Oriented Computing System* filed concurrently herewith the disclosure of which is hereby incorporated herein by reference. The same logic which is used to select subobjects related to a ruler during the cascade of Complex Object actions may be used to select the list of subobjects to be presented on the list panel associated to a particular parts panel.

Typically all the objects which participate in a Complex Object have common rules for determining if they can be viewed or updated. This includes establishing the security level and category. The present invention allows centralization of these decisions within the Complex Object. It also provides protection in case multiple users are processing simultaneous updates to the same Complex Object.

Figure 7:
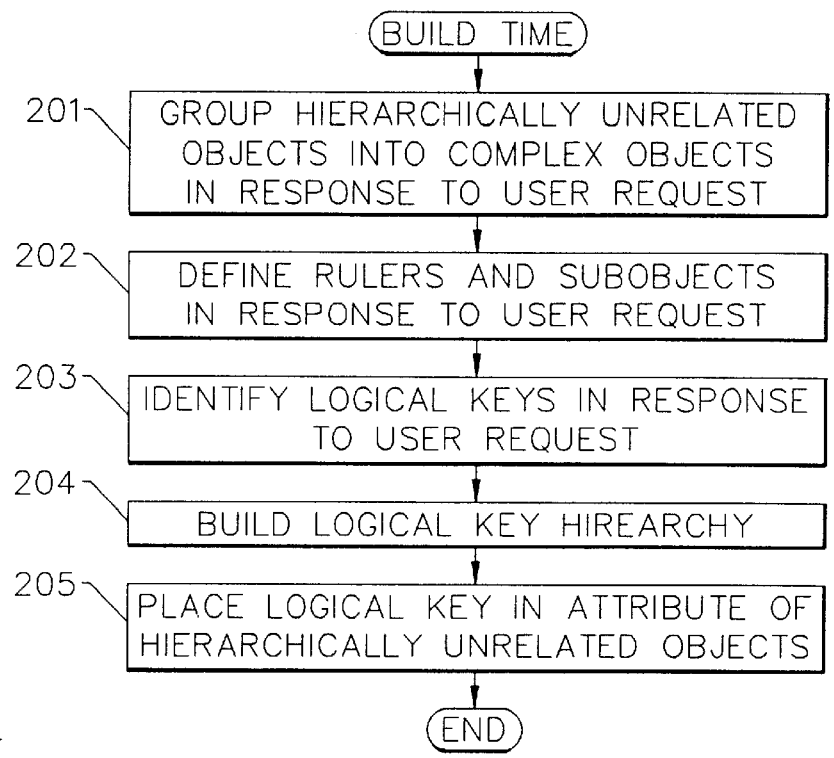
FIG. 7 schematically illustrates operations performed at build time of an object oriented environment in order to implement Complex Object processing according to the present invention.

Referring now to FIG. 7, the following operations are performed at build time of the object oriented environment in order to implement generic Complex Object processing. As shown at Block 201, the hierarchically unrelated objects which are to make up a Complex Object are grouped into Complex Objects in response to user requests. The user requests will typically be initiated because the Complex Objects are to be manipulated as a whole. Then, at Block 202, the ruler and subobject relationships are defined by the user. At Block 203, the logical keys are identified, and a logical key hierarchy is built at Block 204. Finally, at Block 205, the appropriate logical key is placed in the logical key attribute of the objects in the hierarchically unrelated objects. Thus, the structures of FIGS. 4–6 are defined.

Figure 8:
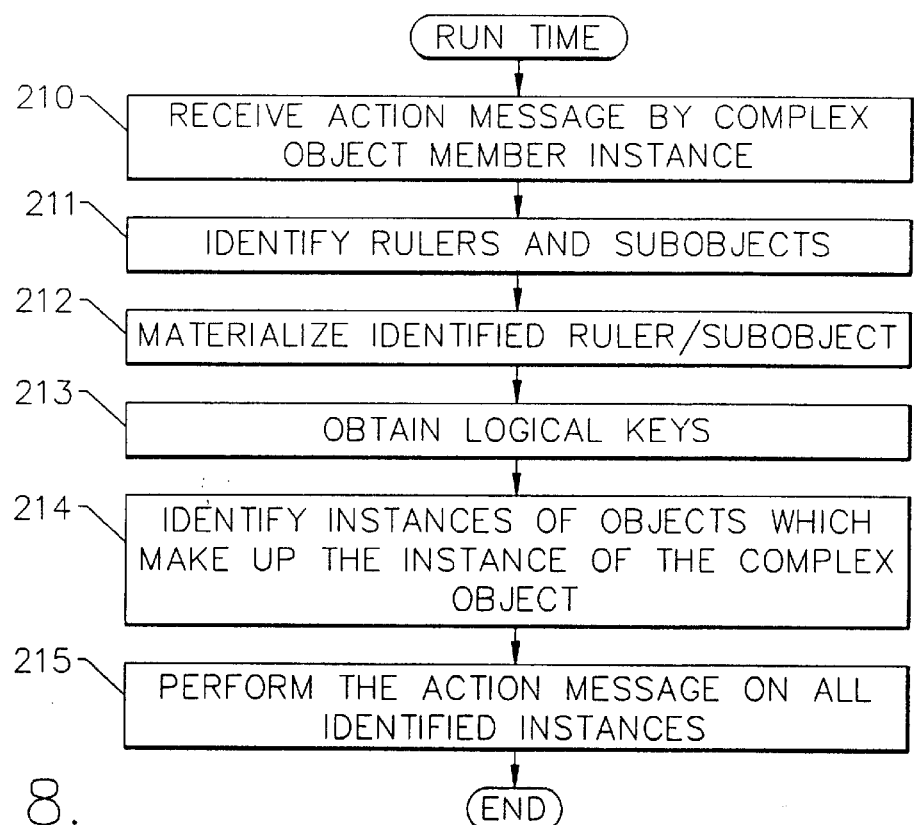
FIG. 8 schematically illustrates operations performed at run time of an object oriented environment in order to implement Complex Object processing according to the pre t invention.

Referring now to FIG. 8, the operations performed at run time will now be described. At run time, an action message is initiated to and received by a Complex Object Member instance at Block 210. The rulers and subobjects of this instance are identified at Block 211 and the identified ruler/subobjects are materialized at Block 212. The logical keys are obtained at Block 213 and the instances of the objects which make up the instances of the Complex Object are materialized at Block 214. Finally, at Block 215 the requested action message is performed on the identified instances. Accordingly, it will be understood by those having skill in the art that the run time processing may be performed for action messages sent to Complex Objects in the same manner that run time processing is performed for action messages sent to simple objects.

Complex Object Support Method and System:

Detailed Design and Implementation

Referring now to FIGS. 9–25, a detailed design implementation of a Complex Object support method and system of the present invention will now be described. A running example will also be described, with the running example applying to a purchase order.

Figure 9:
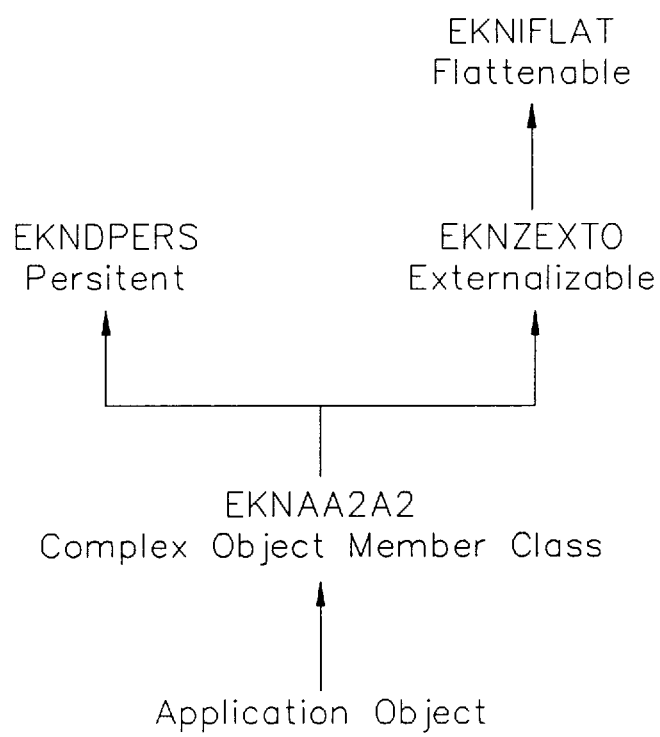
FIG. 9 schematically illustrates an object oriented computing environment including a Complex Object class according to the present invention.
Figure 10:
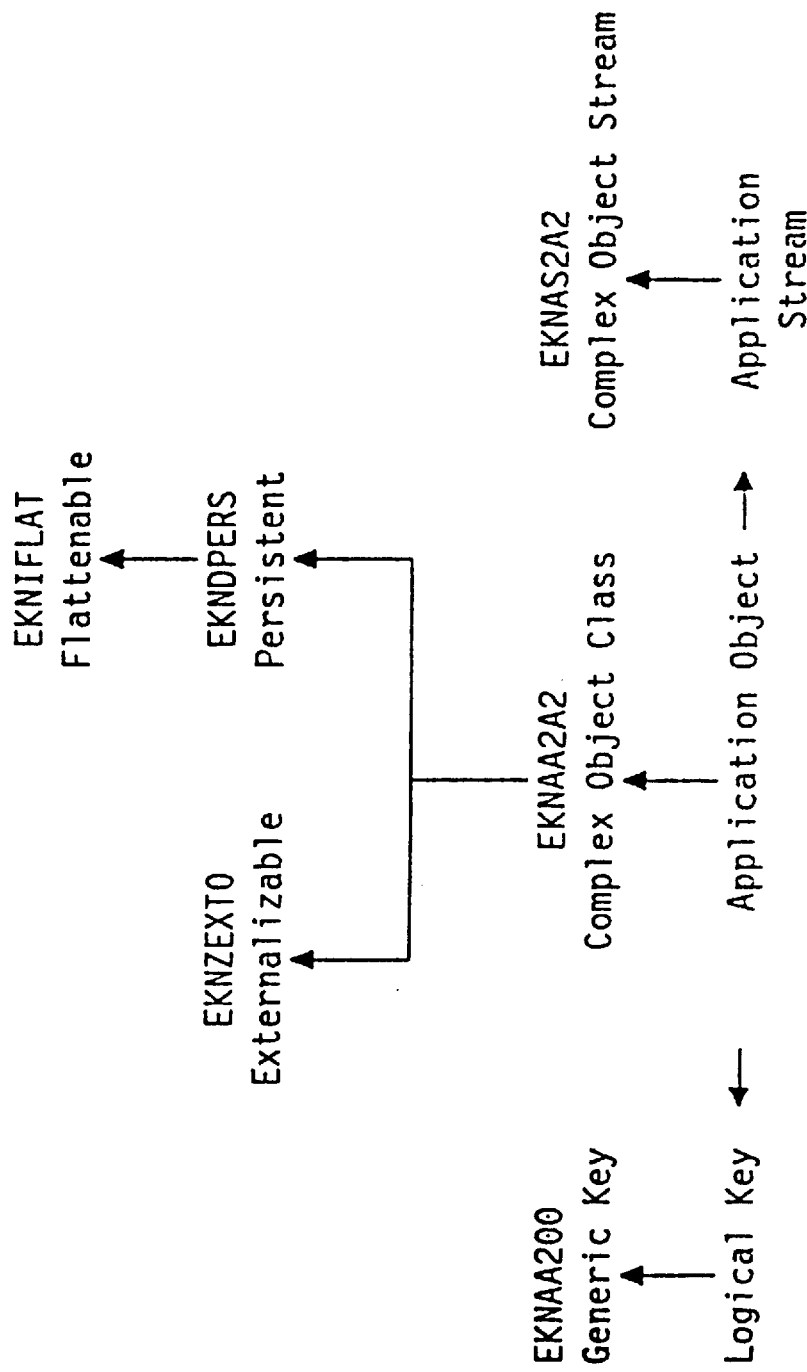
FIG. 10 schematically illustrates a logical key object class according to the present invention.
Figure 11:
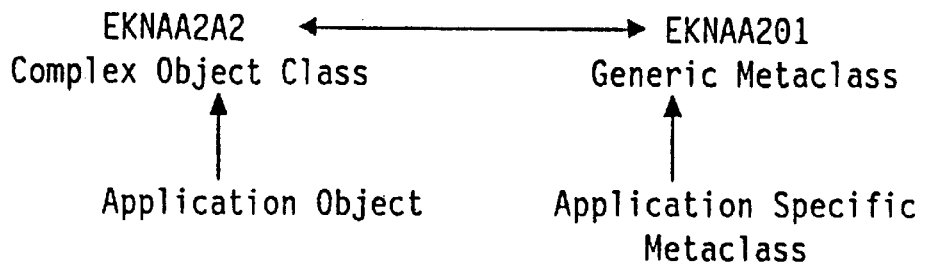
FIG. 11 schematically illustrates an application metaclass in an object hierarchy according to the present invention.

Referring now to FIG. 9, an object oriented computing environment including a Complex Object Member class is described. Complex Objects are composed of simple objects which are both persistent and externalizable. The class hierarchy reflects this. Here the "application object" is a simple object which is part of a Complex Object. It is a ruler and/or subobject.

Each application object has a logical key attribute, which inherits from the Generic Logical Key (EKNAA200). The application object is associated with a stream which inherits from the Complex Object stream class (EKNAS2A1). See FIG. 10. To provide flexibility, application specific decisions are isolated in an application metaclass which inherits from EKNAA201. See FIG. 11.

Figure 12:
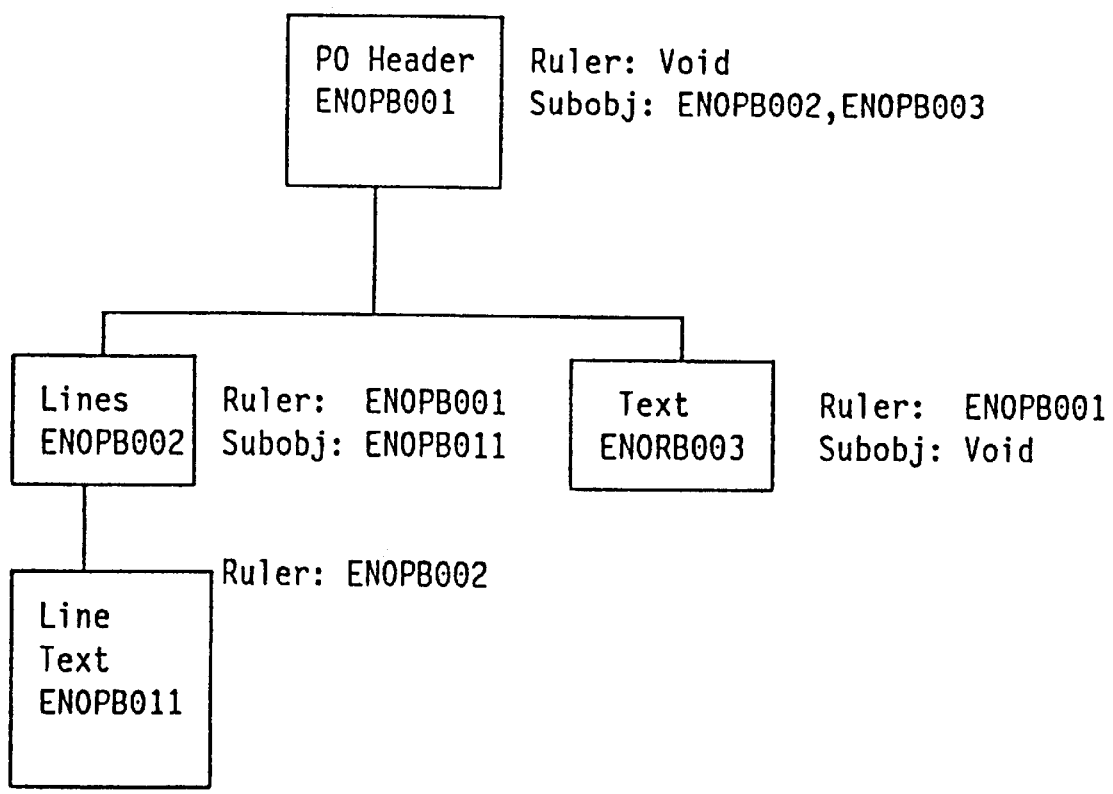
FIG. 12 schematically illustrates an example of a purchase order Complex Object structure according to the present invention.
Figure 13:
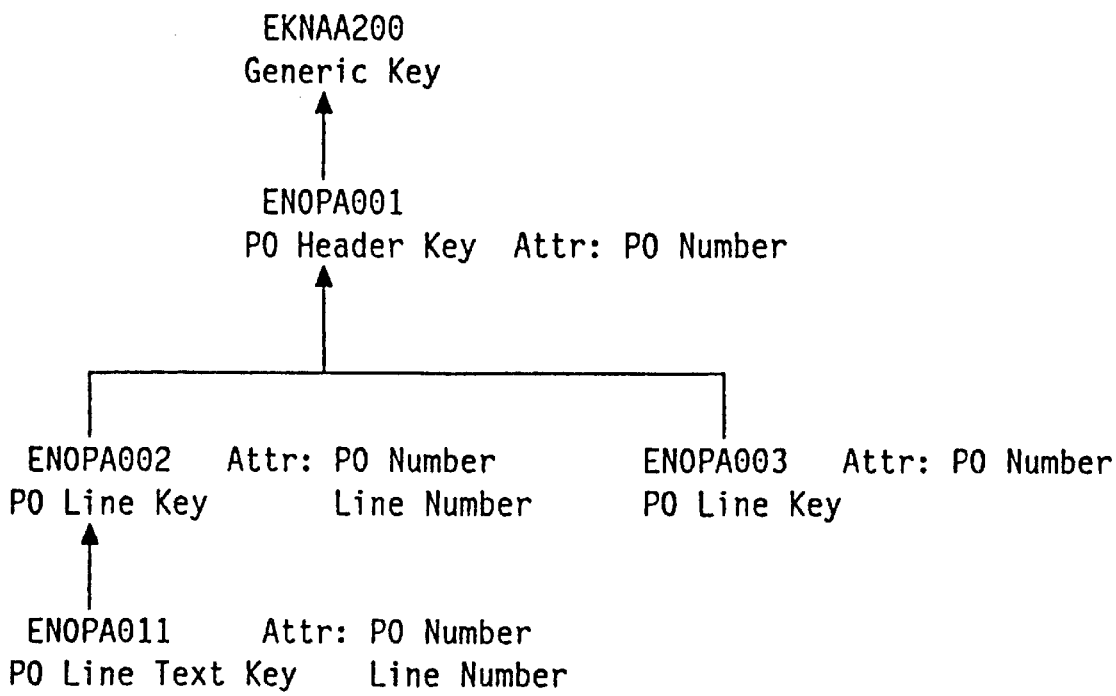
FIG. 13 schematically illustrates an inheritance hierarchy of the logical key classes for the Purchase Order Complex Object structure of FIG. 12.

Two class attributes in the Complex Object Class EKNAA2A2 are used to glue together Complex Object structures: subobjects and ruler ID. Subobjects are the list of short class names of all the direct subobjects of this class. Ruler ID is the short name of the class which is the immediate ruler of this class within the Complex Object structure. An example of a purchase order Complex Object structure is illustrated in FIG. 12.

The inheritance hierarchy of the logical key classes follows the primary Complex Object structure. See FIG. 13. The logical key classes can handle a "partial" logical key passed to them for update. This is accomplished by the assign_key method. This method takes a passed logical key as input, and assigns it to the current logical key. The passed key may be any parent of the current logical key. Only the fields passed in will be changed. This allows, for example, the Purchase Order Number in the Purchase Order Line Key to be updated from Purchase Order 123 to Purchase Order 456, by passing in a Purchase Order Header Key with Purchase Order 456 in it. The Line Number would be unchanged.

The cursors within the associated streams also reflect the Complex Object structure. Each Complex Object stream has an "applicable_at" cursor which selects based on the logical key of the Complex Object ruler. In other words, it selects based on the attributes of the logical key which are inherited. For example, the applicable_at cursor for Purchase Order Line would select based on Purchase Order Number (the attributes of the parent logical key ENOPA001). Each of these streams has logical key (of the current type) as an instance attribute. For example, the stream class for Purchase Order Line ENOPS002 would have an instance attribute LOG_KEY of type ENOPA002 (the Purchase Order Line Key Class). However, the gen_applicable_strm method, which assigns selection criteria and opens the applicable_at cursor would expect to receive a Purchase Order Header Key (ENOPA001) as input. Coding is optimized by making use of the assign_key method on the logical key class, which can handle partial logical keys as input.

Since Complex Object support and version control are compatible, the "find" methods for Complex Object support accept a full or partial logical key, plus a sequence number indicating version selection, as input. The find required for basic Complex Object support (without the potential for multiple versions) is find_applicable, which finds the one instance of a simple object which matches the passed logical key. The equivalent stream method uses a partial instead of full logical key.

The internal logic for the cascaded Complex Object methods includes the sequence number needed for version selection when executing these finds. However, an additional class (EKNAA2B2) is provided which has a "find_simple" method which does not include the sequence number. Find_applicable is redefined in EKNAA2B2 to call find_simple, which is still a deferred method (since it involves SQL calls). This allows application objects which are not version controlled to take advantage of the Complex Object support by inheriting from EKNAA2B2 and implementing a find which only expects logical key as a parameter.

EKNAA2B2 also treats the version selection fields insert_by and exact_by as non-persistent attributes, and initializes them to appropriate values. This means that the persistent retrieve method for Complex Objects which are not version controlled can just call this inherited initialization, and not have to deal with the attributes specific to version control. In addition, the default application metaclass (EKNAA201) implements a "no version control" option, so that no additional specification logic is required for applications which are not version controlled.

Figure 14:
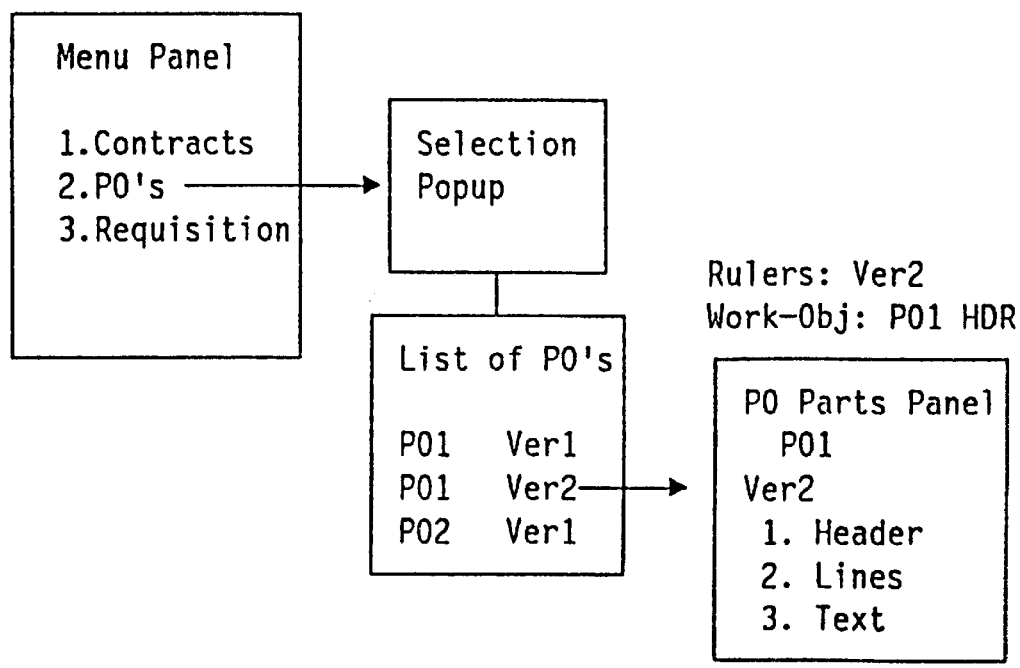
FIG. 14 schematically illustrates a ruler list for the Purchase Order Complex Object structure of FIG. 12.
Figure 15:
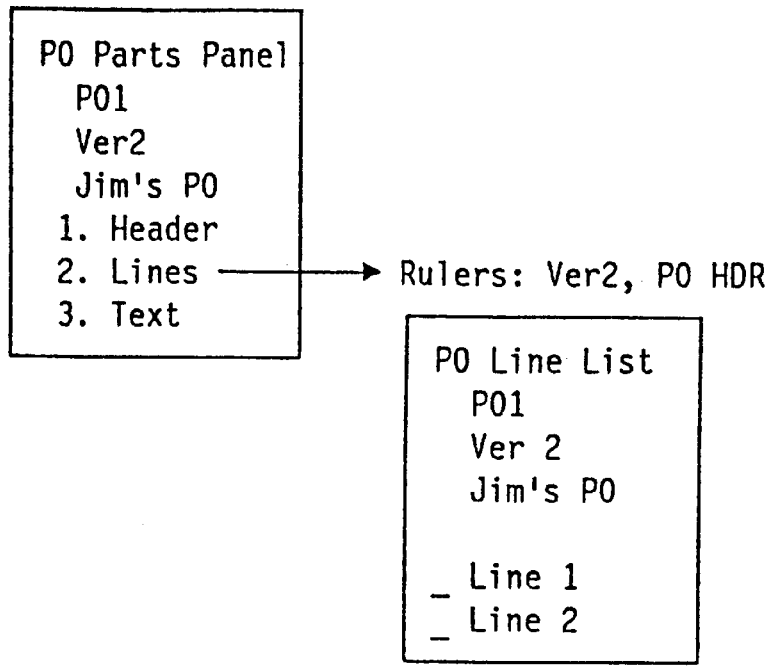
Figure 16:
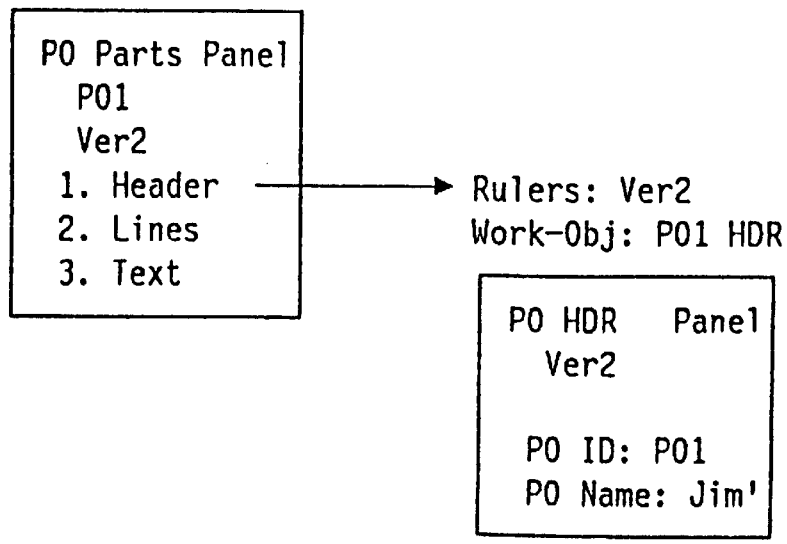
Figure 17:
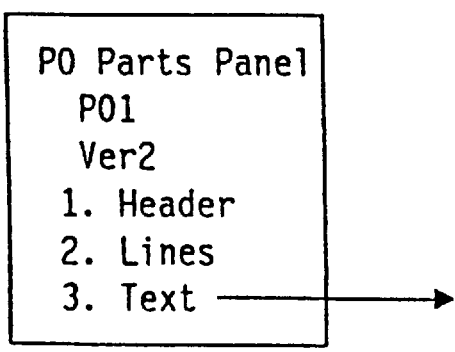
Figure 17:
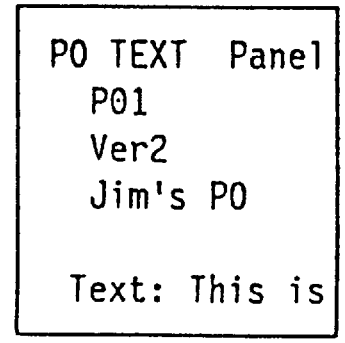
Figure 18:
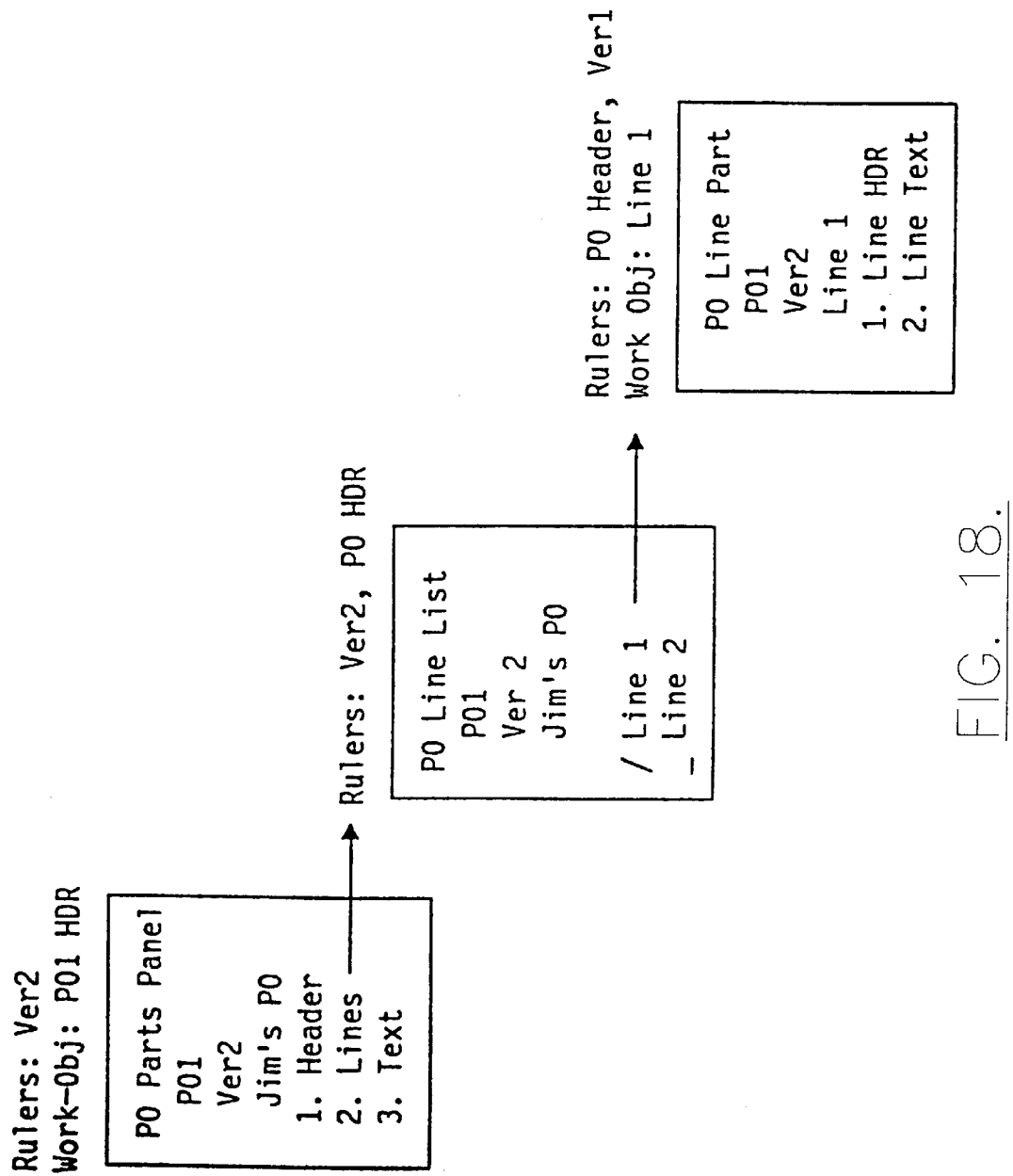

Referring to FIG. 14, contextual information is contained in an attribute called the ruler list. This is an attribute of the Externalizable Object (EKNZEXTO). During online processing the ruler list is built up dynamically as the panel flow follows the Complex Object structure. In the example of the purchase order Complex Object, a list of purchase orders would be selected from a main menu panel. The selection popup restricts the purchase orders that appear in the list. Since the Purchase Order is a Complex Object, a parts panel instead of a data entry panel is displayed when a Purchase Order is opened. The ruler list associated to the parts panel is derived from the "context" data used to pick that particular version of the Complex Object. In this case, the context is the version selection object (Ver2).

The parts panel now controls building up the ruler list and passing it to the other panels invoked from the parts panel. If a list panel is the next panel, the working object is added to the ruler list. This is true, for example, if Lines is selected from the parts panel. See FIG. 15. It is also possible to select Lines and the File action of New (instead of File.Open). This will result in a Line data entry panel (in New mode) being displayed. In this case, the ruler list would be the same as that assigned to the line panel.

If the next panel is a data entry panel, a check is made to see if its working object is the same as the working object for the parts panel. If it is, the working object is not added to the ruler list of the data entry panel. See FIG. 16. If the working objects are not the same, the working object for the parts panel is added to the ruler list of the data entry panel. See FIG. 17. If the next panel is a parts panel, processing is similar to that used when the next panel is a data entry panel. Note that a succession of parts panels will add to the ruler list as data navigation follows the Complex Object structure. When a list entry in a list panel is opened, the ruler list for the list panel is passed to the data entry or parts panel. The selected object becomes the working object. See FIG. 18.

Figure 20:
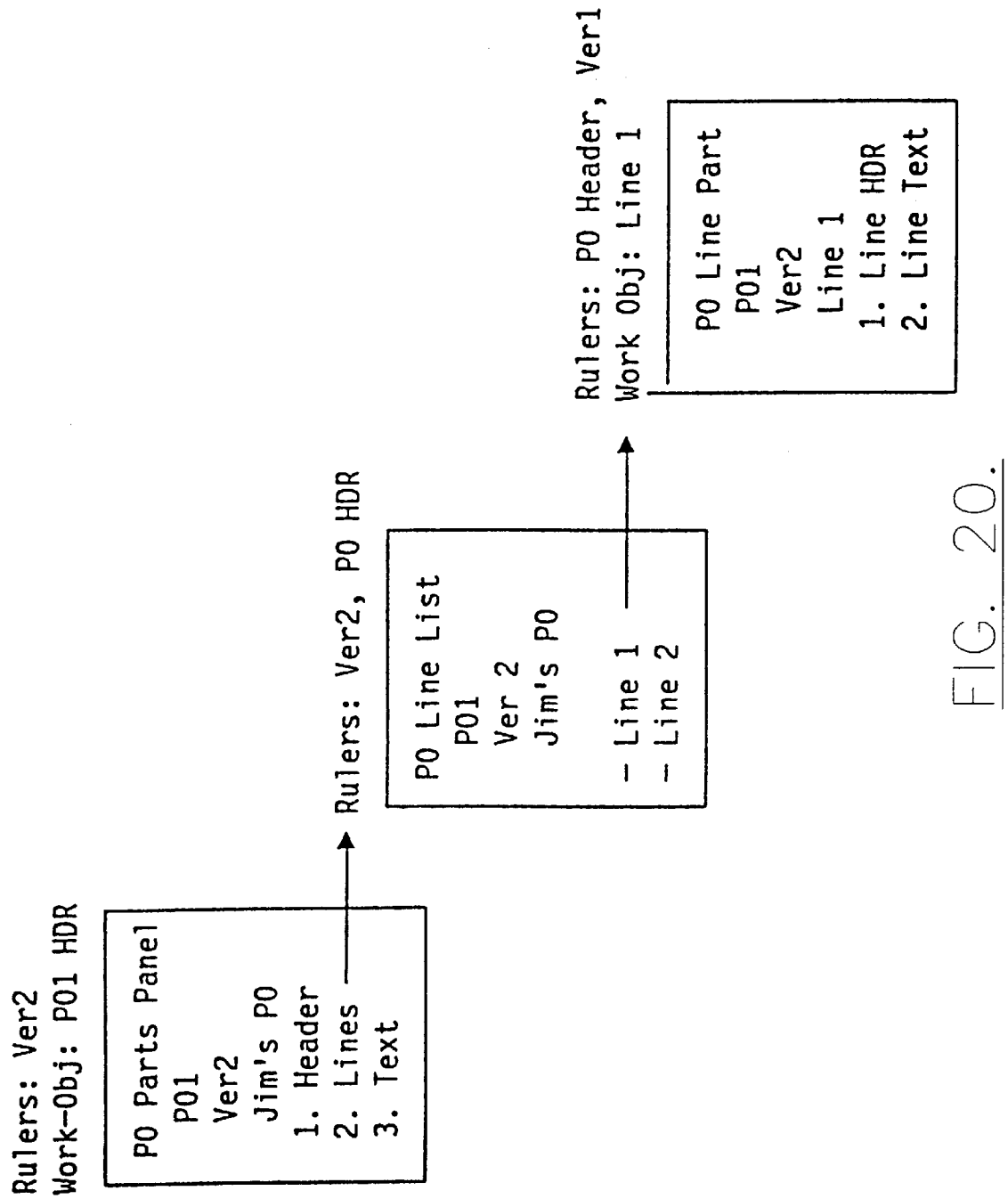
Figure 21:
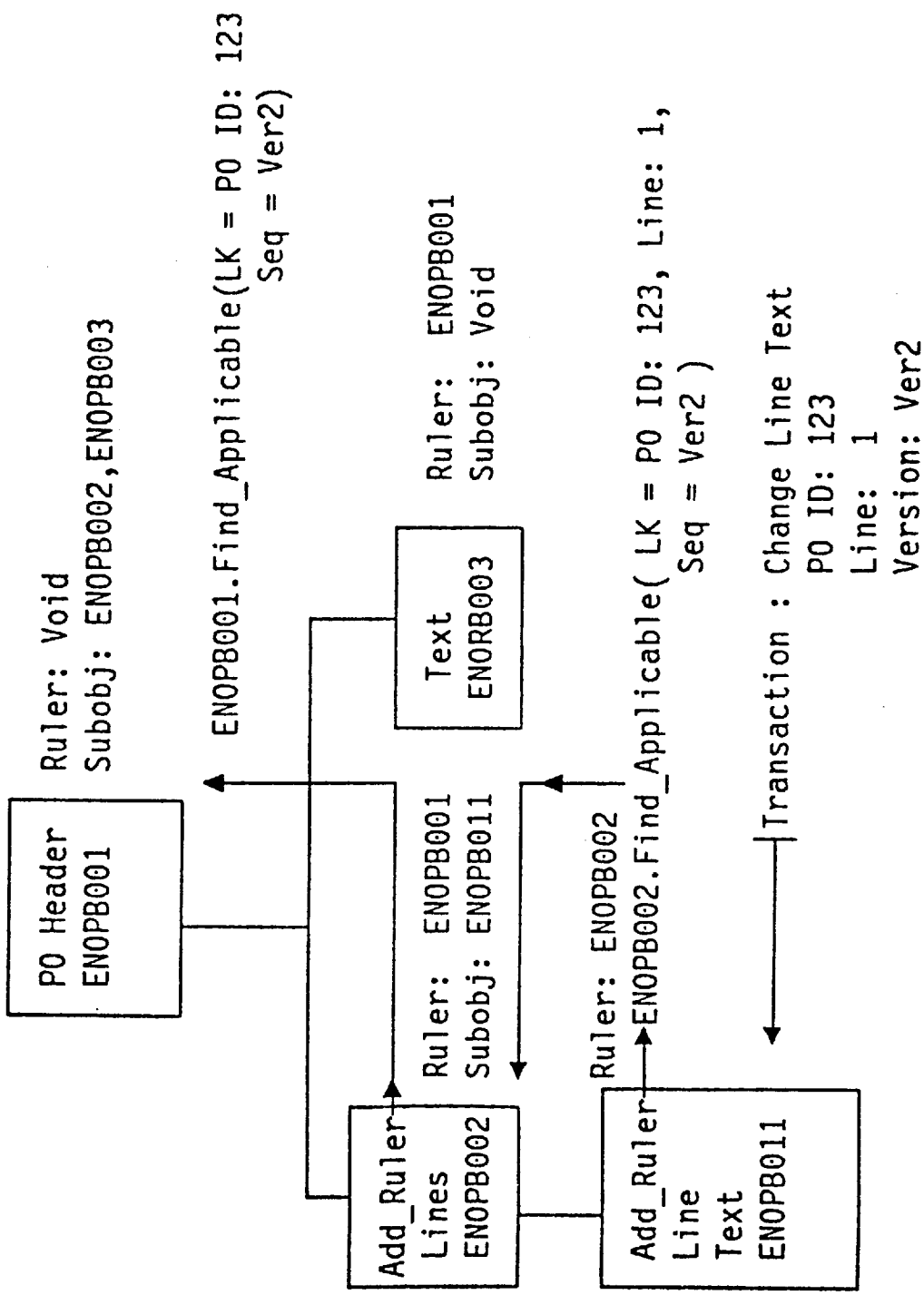
FIG. 21 schematically illustrates the use of ruler list with ver ion controlled objects according to the present invention.

The rules for adding the working object to the ruler list when a panel is opened from the parts panel are as already described. For example, if Line Text is opened, Line 1 will be added to the ruler list of the Line Text data entry panel. See FIG. 19. When a list entry in a list panel is opened, the ruler list for the list panel is passed to the data entry or parts panel. The selected object becomes the working object as shown in FIG. 20. The data entry panel then assigns its ruler list to the working object, which can use it for contextual information and validations during its own processing.

During background (or "fastpath" online) processing, transactions may be directed immediately to a simple object (e.g. a purchase order Line) which is part of a Complex Object. In this case, the transaction must have enough context information within it (the purchase order Header Name and Version Name), to identify which purchase order Line is to be processed. The Generic Complex Object support provided by the present invention will fill in the ruler list for the rulers within the primary Complex Object by following the chain of ruler id's, and use the "find applicable" method in each case (passing the subobject's logical key). In the case of version controlled objects, the same selection sequence number derived from the transaction input would be used for all the finds. See FIG. 21.

The additional context rulers (such as the version selection object for Version 2) are obtained by the "build_ruler_list" method of the Application Specific Metaclass. This method is a deferred method in the Generic Metaclass. The additional context rulers are typically common for an entire Complex Object, so that all participants in that Complex Object can use a common application specific metaclass.

Many actions applied to an object which also has subobjects must be applied to the subobjects also. The two which have specific support in the present invention are "copy" and "delete". The present invention also provides the context to easily define additional Complex Object actions which follow the same pattern for cascade.

Each cascaded Complex Object is broken into two separate methods: a class method (e.g. copy_c), and an instance method (e.g. copy_i). The class method is invoked by the instance method of a ruler object, or directly as a direct user action. It is passed the ruler's logical key plus version selection, and a ruler list which includes the immediate ruler plus the ruler list which was passed to that ruler during the cascade. It checks a class attribute (e.g. "copy_me") to see if this method is valid for this object type. The class method is used to find one or more instances to work on. The passed ruler list is assigned to each relevant instance the corresponding instance method is invoked. For pure Complex Object actions such as copy and delete, find_applicable or gen_applicable_strm are used to find the instances to work on. Find_applicable is used if the ruler's logical key is the full logical key for the current object, and the stream method is used if the ruler provides only a partial logical key.

The instance method performs the relevant action (e.g. copy) to the instance. Note that the ruler_list is also copied as the "to" object is created. In the case of the copy method, the ruler list is the one for the "to" object, and it is used to allow context validations on the "to" object, even though its related context information has not yet been committed to the data base.

The instance method next checks if there are any subobjects by using the class attribute. If there are, it invokes the class method for each subobject, passing an enhanced logical key (usually its own) and an expanded ruler list. Additional parameters may also be expanded. For example, in the copy method, the "new_key" is also expanded to include the full key of the newly created "to" object.

Figure 22:
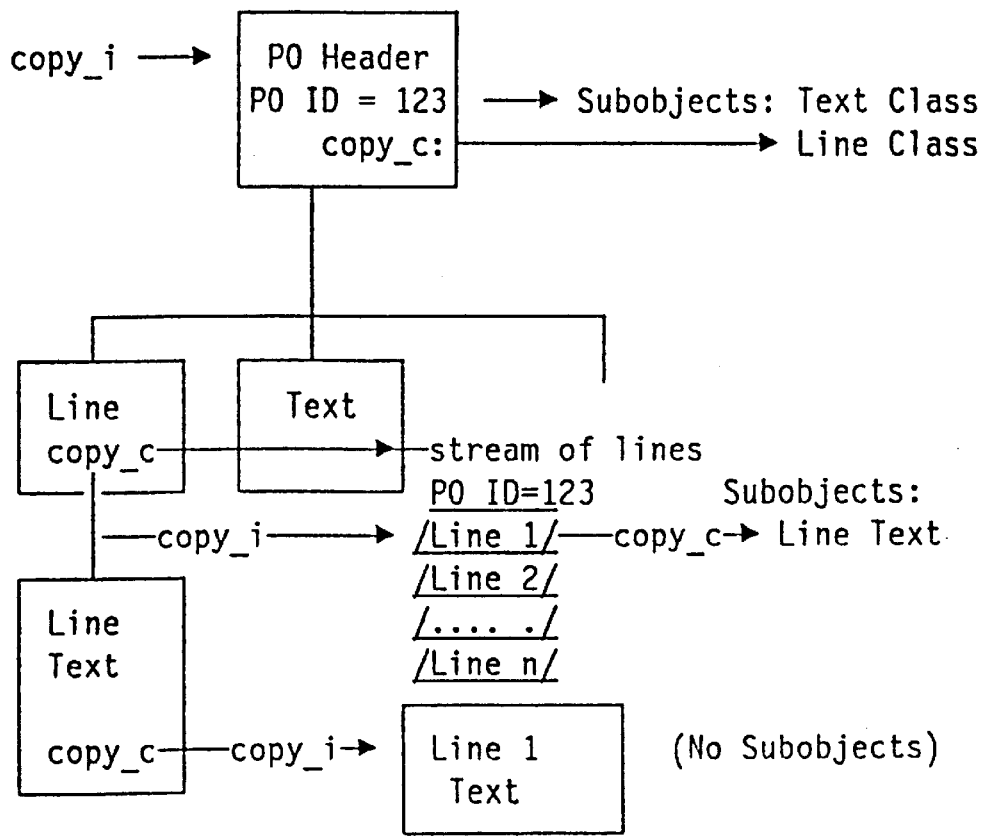
FIG. 22 schematically illustrates copying of a Complex Object according to the present invention.

The method to expand the key during Complex Object cascades is designed to allow redefinition in special circumstances. This is in case only portions of a Complex Object are to be copied, but that refinement is not apparent at the top of the Complex Object structure. For example, Bill of Material Data may have Planning, Engineering, and Supplier views. However, the Item data is in common for all views. A copy of Planning view to create a new Item and Bill of Material must include the Item Data. However, the Plan identification is not part of the logical key for the Item Data, so it will not be available within that key when the copy cascades from Item Header to BOM Header. FIG. 22 is an example of cascaded copy using the Purchase Order Complex Object structure.

The panel flow for presentation of Complex Objects follows the hierarchical structure of the Complex Object. Four types of panels are used. Menu Panels list various types of Complex Objects which may be manipulated. List Panels may list simple objects or Complex Objects. If the object in the list is complex (it has subobjects) then the next panel to be displayed is a parts panel. Parts Panels are used for Complex Objects (objects which have subobjects). The object itself, or any of its subobjects, may be selected from the panel. For example, the Purchase Order Header has Purchase Order Line and Purchase Order Text as subobjects, so the Parts Panel for Purchase Order Header allows selection of Purchase Order Header, Purchase Order Line, or Purchase Order Text. The selection may result in display of a List of the selected objects (if the logical key of the subobject extends the logical key of the ruler object for the parts panel). If the logical keys are identical, a Data Entry or Parts Panel (if the subobject itself is complex) will be displayed. Finally, Data Entry Panels allow view and update of the data related to a simple object. They are the end nodes of the panel flow.

Figure 23:
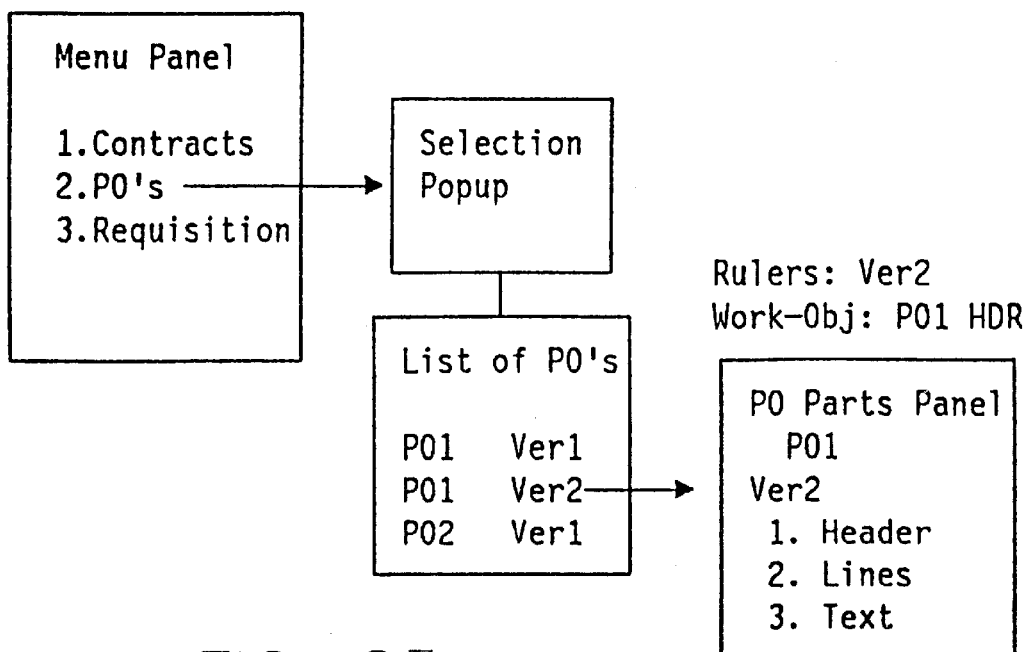
FIGS. 23–25 schematically illustrate an example of using the Purchase Order Complex Object.
Figure 24:
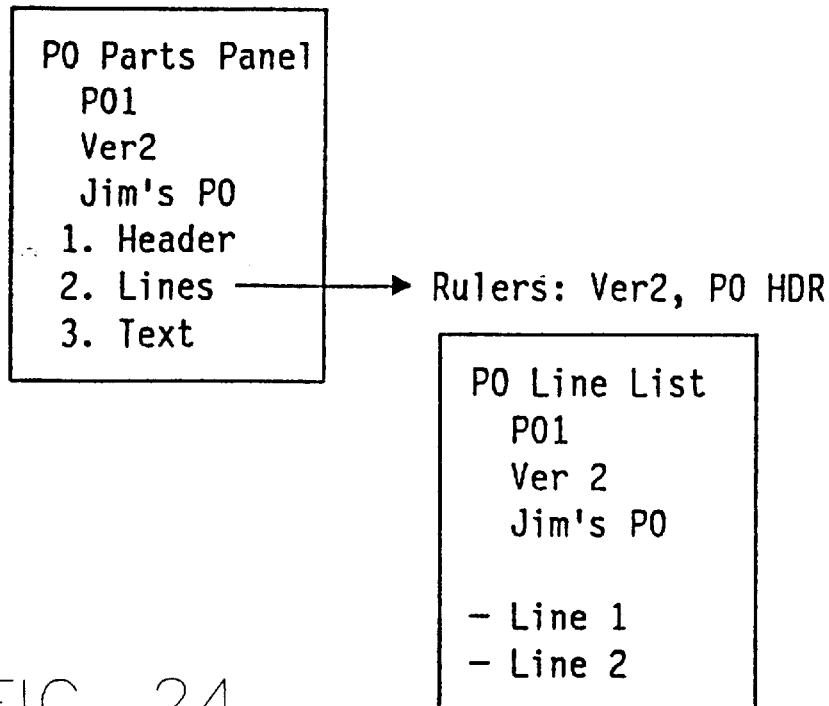
Figure 25:
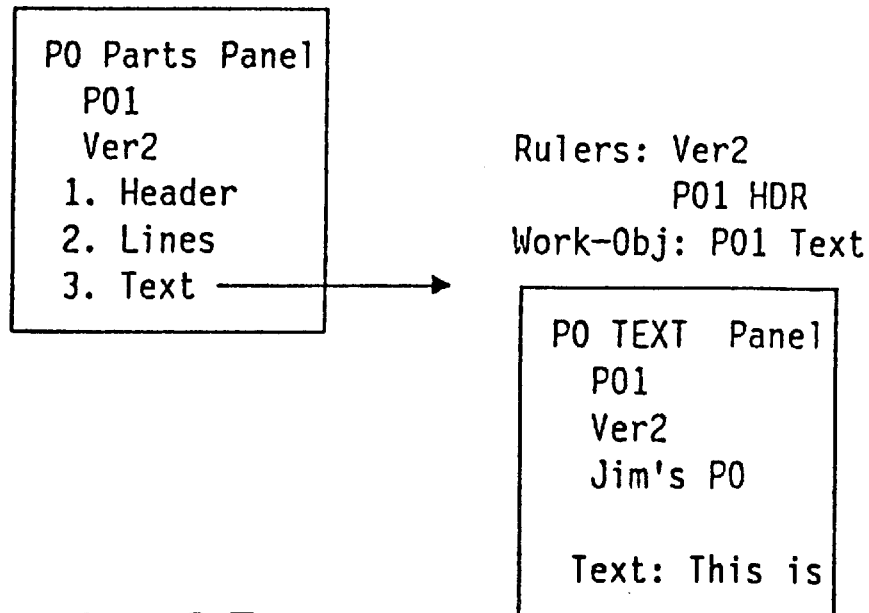

FIGS. 23–25 illustrate an example using the Purchase Order Complex Object. A list of purchase orders would be selected from a main menu panel. The selection popup restricts the purchase orders that appear in the list. Since the Purchase Order is a Complex Object, a parts panel instead of a data entry panel is displayed when a Purchase Order is opened. See FIG. 23. Since Purchase Orders are version controlled, any version selection criteria must be taken into account during selection from this initial list. The selection popup to select the list may include restrictions of which version to choose. As already described, the version selection information becomes part of the contextual objects included in the ruler list for the first parts panel and all subsequent panels.

When a selection is made, the parts panel checks if the panel to be opened is a list panel, a parts panel, or a data entry panel. If the panel is a list panel, the open_part method is called passing the ruler list (with the working object added. The list panel open_part then uses information in the ruler list to create a stream of the appropriate kind of object. The present invention specializes the creation of the stream to take advantage of the logical key and stream relationships provided here. For example, as shown in FIG. 24, if Line is selected, a stream of lines which match the purchase order number Purchase Order1 would be selected.

If the next panel is a data entry panel, a check is made to see if its working object is the same as the working object for the parts panel. If it is not, the find_internal method on new working object, which is redefined to call find_applicable by the present invention, is used to find an instance of the new working object to open. This assumes that the logical keys will remain the same if no attributes are added, i.e. the ruler-to-subobject relationship is one-to-one. Thus, the logical key of the working object for the parts panel (e.g. the Purchase Order Header Logical Key) can be passed to the find_applicable method of the selected object (e.g. a Purchase Order Text). In this example, there is only one Purchase Order Text object per Purchase Order (and version), and it is uniquely identified by the Purchase Order number (Purchase Order1) and the version (Ver2). See FIG. 25. If the next panel is a parts panel, processing is similar to that used when the next panel is a data entry panel.

Two methods, update_allowed and open_allowed, are used to enforce Complex Object locks. These are methods on the Externalizable Object (EKNZEXTO), which are invoked by both interactive and batch processing. Both these methods are passed the current ruler list. The methods can be redefined by each application to find the rulers of interest within the ruler list, and to invoke the appropriate methods on the rulers to determine if update (or display) is allowed. Since these decisions are usually uniform within an application area, the update_allowed and open_allowed methods are redefined in EKNAA2A1 to call open_allowed and update_allowed methods on the Application Metaclass EKNAA201. This allows a particular Complex Object to change the way it enforces its Complex Object locking by redefining the methods in EKNAA201 (and allows greater flexibility). EKNAA2A2 also redefines the check_tags method to call update_allowed, and to make the entire panel display only if update is not allowed. This also disables File.Save. The check_tags method is described in the above cited application Ser. No. 08/101,904.

Several users may simultaneously update data within the same Complex Object. This may result in data integrity problems if a ruler is updated so that it no longer permits update of its subobjects (e.g. an EC is promoted into Release status while a BOM Component affected by that EC is being updated), or the ruler object is deleted as a new subobject is being added, or an existing subobject updated (e.g. a BOM Header is deleted while a BOM Component is added to the Bill of Material). In order to protect against these problems, the generic data entry panel and generic list panel, force rematerialization of the persistent objects in the ruler list prior to invoking validations and processing in the internal object. This ensures that the validations are against the most current data available for the rulers.

In addition, the File.Save method in the generic data entry panel makes an additional call to update_allowed, again forcing rematerialization of the persistent objects in the ruler list. As an additional option, the File.Delete and File.Save actions can perform a notify to each of the objects in the ruler list. This ensures that no updates have taken place to the objects in the ruler list between the time they were last rematerialized and the actual database commit of the object being updated. This additional check is controlled by a class attribute, so that it can be invoked selectively.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An object oriented computing system in an object oriented computing environment comprising:

a computing platform;

a plurality of objects residing on said computing platform, each including an object frame containing data attributes and at least one object method which performs actions on the associated object, said objects being arranged in an inheritance hierarchy of objects to define parent and child objects such that child objects inherit the data attributes and methods of parent objects and to further define objects in said inheritance hierarchy which are unrelated as parent and child objects such that unrelated objects do not inherit the data attributes and methods of each other;

an object manager which sends messages to said objects to perform actions on the associated object frame using the associated object messages; and means, executing on said computing platform and responsive to a user request, for grouping selected ones of said objects in said inheritance hierarchy which are unrelated to each other as parent and child objects, into a plurality of Complex Objects, each Complex Object Member including a Complex Object Member frame containing pointers to grouped objects in said inheritance hierarchy which are unrelated to each other as parent and child objects, and a plurality of Complex Object methods which perform actions on the grouped objects as a group notwithstanding that the grouped objects in said inheritance hierarchy are unrelated as parent and child objects;

wherein said object manager sends action messages to said Complex Object Members to perform actions on the grouped objects using the associated Complex Object methods.

2. The system of claim 1 wherein each of said objects in said inheritance hierarchy which are unrelated as parent and child objects comprises one of a ruler object and a subobject; and wherein said Complex Object Member frame points to at least one of a ruler object which controls performance of the Complex Object, and a subobject which is controlled by the Complex Object.

3. The system of claim 2 further comprising means for identifying instances of said Complex Object Members.

4. The system of claim 3 wherein said identifying means comprises means, responsive to a user request, for generating an inheritance hierarchy of logical key attributes for each of said Complex Object Members, each logical key attribute containing attributes which identify instances of the objects which form the associated Complex Object.

5. The system of claim 4 wherein said identifying means further comprises means, responsive to said logical key attributes inheritance hierarchy generating means, for placing the logical key attribute of a respective object which forms an associated Complex Object, in the object frame of the respective object which forms an associated Complex Object.

6. The system of claim 4 wherein said logical key attributes inheritance hierarchy generating means generates the inheritance hierarchy of logical key attributes to reflect the ruler-to-subobject relationships in the associated Complex Object.

7. The system of claim 1 wherein said grouping means groups selected ones of said objects into Complex Object methods which include a method for deleting a Complex Object and a method for copying a Complex Object.

8. A method for performing actions on objects in an object oriented computing system on a computing platform, including a plurality of objects in said object oriented computing system, each object including an object frame containing data attributes and at least one object method for performing actions on the associated object, said objects being arranged in an inheritance hierarchy of objects to define parent and child objects such that child objects inherit the data attributes and methods of parent objects and to further define objects in said inheritance hierarchy which are unrelated as parent and child objects such that unrelated objects do not inherit the data attributes and methods of each other, said object oriented computing system further including an object manager for sending messages to said objects to perform actions on the associated object frame using the associated object messages; said action performing method comprising the following steps which are performed by said object oriented computing system in response to a user request:

grouping selected ones of said objects in said inheritance hierarchy which are unrelated to each other as parent and child objects, into a plurality of Complex Objects, each Complex Object Member including a Complex Object Member frame containing pointers to grouped objects in said inheritance hierarchy which are unrelated to each other as parent and child objects, and a plurality of Complex Object methods which perform actions on the grouped objects as a group notwithstanding that the grouped objects in said inheritance hierarchy are unrelated as parent and child objects; and sending action messages, in response to said grouping step, to said Complex Objects to perform actions on the grouped objects using the associated Complex Object methods.

9. The method of claim 8 wherein each of said objects in said inheritance hierarchy which are unrelated as parent and child objects comprises one of a ruler object and a subobject; and wherein said Complex Object Member frame points to at least one of a ruler object which controls performance of the Complex Object, and a subobject which is controlled by the Complex Object.

10. The method of claim 9 wherein said sending step is preceded by the step of generating an inheritance hierarchy of logical key attributes for each of said Complex Objects, each logical key attribute containing a pointer to instances of the objects which form the associated Complex Object.

11. The method of claim 9 wherein said inheritance hierarchy generating step is followed by the step of placing the logical key attribute of a respective object which forms an associated Complex Object, in the object frame of the respective object which forms an associated Complex Object.

12. A method for performing actions on objects in an object oriented computing system on a computing platform, including a plurality of objects in said object oriented computing system, each object including an object frame containing data attributes and at least one object method for performing actions on the associated object, said objects being arranged in an inheritance hierarchy of objects to define parent and child objects such that child objects inherit the data attributes and methods of parent objects and to further define objects in said inheritance hierarchy which are unrelated as parent and child objects such that unrelated objects do not inherit the data attributes and methods of each other, said object oriented computing system further including an object manager for sending messages to said objects to perform actions on the associated object frame using the associated object messages; said action performing method comprising the following steps which are performed by said object oriented computing system in response to a user request:

grouping selected ones of said objects in said inheritance hierarchy which are unrelated to each other as parent and child objects, into a plurality of Complex Objects, each of said objects in said inheritance hierarchy which are unrelated as parent and child objects comprises one of a ruler object and a subobject, and each Complex Object Member including a Complex Object Member frame containing at least one pointer to at least one of a ruler object which controls performance of the Complex Object Member, and a subobject which is controlled by the Complex Object Member, and a plurality of Complex Object methods for performing actions on the grouped objects as a group notwithstanding that the grouped objects in said inheritance hierarchy are unrelated as parent and child objects;

placing the pointers to ruler objects and subobjects into the associated Complex Object Member frame;

identifying logical keys, in response to said pointers placing step, for each Complex Object Member, said logical keys containing pointers to instances of the ruler objects and subobjects;

building an inheritance hierarchy of logical keys, in response to said identifying step, for each Complex Object, according to the ruler and subobject relationships of the associated Complex Object Member; and placing the logical key of each Complex Object Member into the object frame thereof in response to said building step.

13. The method of claim 12 wherein the following steps are performed in response to an action message which is directed to an instance of one of said Complex Objects:

identifying the ruler objects and subobjects of said Complex Object;

materializing the identified ruler objects and subobjects;

obtaining the logical key of said Complex Object;

identifying instances of said Complex Object based upon the obtained logical key of said Complex Object and the inheritance hierarchy of the logical keys; and performing the action message on the identified instances of said Complex Object.

* * * * *